(12) United States Patent
Watanabe et al.

(10) Patent No.: US 8,097,549 B2
(45) Date of Patent: Jan. 17, 2012

(54) METHOD FOR MANUFACTURING CORDIERITE CERAMICS

(75) Inventors: Atsushi Watanabe, Nagoya (JP); Yuji Katsuda, Tsushima (JP); Yohei Ono, Kiyosu (JP)

(73) Assignee: NGK Insulators, Ltd., Nagoya (JP)

( * ) Notice: Subject to any disclaimer, the term of this patent is extended or adjusted under 35 U.S.C. 154(b) by 317 days.

(21) Appl. No.: 12/395,886

(22) Filed: Mar. 2, 2009

(65) Prior Publication Data

US 2009/0247389 A1 Oct. 1, 2009

(30) Foreign Application Priority Data

Mar. 25, 2008 (JP) ................... 2008-077290

(51) Int. Cl.
*C04B 35/03* (2006.01)
*C04B 35/04* (2006.01)
*C04B 35/44* (2006.01)
*C04B 35/00* (2006.01)
*B32B 3/12* (2006.01)

(52) U.S. Cl. ........ 501/119; 501/112; 501/121; 501/128; 428/116

(58) Field of Classification Search ............... 501/80–85, 501/112, 118, 119, 120, 121, 122, 128–131, 501/141, 143, 144; 428/116
See application file for complete search history.

(56) References Cited

U.S. PATENT DOCUMENTS

| | | | |
|---|---|---|---|
| 3,885,977 A | 5/1975 | Lachman et al. | |
| 4,280,845 A | 7/1981 | Matsuhisa et al. | |
| 4,869,944 A | 9/1989 | Harada et al. | |
| 6,284,693 B1 * | 9/2001 | Beall et al. ................ | 501/119 |
| 2006/0270546 A1 * | 11/2006 | Wusirika .................. | 501/119 |
| 2007/0281127 A1 * | 12/2007 | Backhaus-Ricoult et al. ........................ | 428/116 |
| 2008/0057267 A1 * | 3/2008 | Brocheton et al. ........ | 428/116 |

FOREIGN PATENT DOCUMENTS

| | | |
|---|---|---|
| EP | 0 201 319 A2 | 11/1986 |
| EP | 0 506 301 A2 | 9/1992 |
| JP | 50-075611 A1 | 6/1975 |
| JP | 53-082822 A1 | 7/1978 |
| JP | 04-305076 A1 | 10/1982 |
| JP | 61-256965 A1 | 11/1986 |
| JP | 64-003067 A1 | 1/1989 |

\* cited by examiner

*Primary Examiner* — Jerry A Lorengo
*Assistant Examiner* — Noah Wiese
(74) *Attorney, Agent, or Firm* — Burr & Brown

(57) ABSTRACT

A method for manufacturing cordierite ceramics is provided, including forming and heating a cordierite-forming raw material containing α-alumina. The degree of orientation, expressed by $(I_{006}/(I_{300}+I_{006}))$, where $I_{hkl}$ is height of X-ray diffraction intensity of an hkl-face of an α-alumina crystal, by X-ray diffraction measurement of an α-alumina crystal in a formed article of the raw material for forming cordierite is 0.10 or more.

4 Claims, 2 Drawing Sheets

METHOD FOR MANUFACTURING CORDIERITE CERAMICS

FIELD OF THE INVENTION

The present invention relates to cordierite ceramics known as the main component of a honeycomb structured catalyst carrier for carrying a catalyst purifying exhaust gas from an internal combustion engine such as an automobile engine and to a method for manufacturing cordierite ceramics.

BACKGROUND OF THE INVENTION

Cordierite ceramics are widely used as a high temperature gas filter or a catalyst carrier for carrying an exhaust gas purification catalyst of an automobile engine because cordierite ceramics show low thermal expansion and have excellent thermal resistance and thermal shock resistance. For example, cordierite ceramics are adapted as the main component of a honeycomb shaped porous catalyst carrier for automobile exhaust gas purification and required to obtain excellent thermal resistance and thermal shock resistance.

Cordierite ceramics used as automobile engine exhaust gas purification catalyst carriers are widely used as honeycomb shaped ceramics. A cordierite honeycomb structure used as the automobile engine exhaust gas purification catalyst carrier is required to have low thermal expansion in the direction in parallel with the faces of the partition walls of a honeycomb shape in comparison with the other directions.

For example, it has been known that thermal expansion in the direction in parallel with the faces of the partition walls of the cordierite honeycomb structure can be lowered by orienting the c-axis of a cordierite crystal toward the direction in parallel with the faces of the partition walls (see, e.g., JP-A-50-075611). With regard to a method for orienting the c axis of a cordierite crystal with respect to a certain face, many techniques have been disclosed regarding conditions of materials constituting the cordierite-forming raw material, conditions upon forming the raw material for forming cordierite, conditions upon firing (heating) a formed article of the raw material for forming cordierite, and the like (see, e.g., JP-A-50-075611, JP-A-53-082822, and JP-A-64-003067).

Examples of the material constituting a cordierite-forming raw material include talc, kaolinite, silica, and alumina. It has been noted that, of these, alumina inhibits reduction in thermal expansion coefficient of the resultant cordierite ceramics (see, e.g., JP-A-50-075611).

For example, when the particle diameter of α-alumina used as a material for the raw material for forming cordierite is 3 µm or less, a reaction with talc in firing proceeds at 1300° C. or less. The reaction between α-alumina and talc inhibits a reaction between talc and kaolinite important for generation of cordierite having low expansion (see, e.g., JP-A-61-256965). On the other and, when the particle diameter of α-alumina used as a material for the raw material for forming cordierite is 15 µm or more, it is necessary to raise reaction temperature for cordierite generation, and the resultant cordierite ceramics have high thermal expansion coefficient with poor thermal resistance and thermal shock resistance.

As described above, since alumina used as a material for a cordierite-forming raw material affects thermal resistance and thermal shock resistance of the cordierite ceramics as final products, there have been proposed methods where action inhibiting thermal resistance and thermal shock resistance by alumina is reduced. However, there has been disclosed neither constitutions nor conditions for making alumina used as a material for a cordierite-forming raw material positively function to improve thermal resistance and thermal shock resistance of cordierite ceramics.

SUMMARY OF THE INVENTION

Therefore, the present invention aims to provide a method for manufacturing cordierite ceramics having improved thermal resistance and thermal shock resistance by the use of an C-alumina crystal having a specific shape by studying a crystal structure of alumina used as a material for a cordierite-forming raw material.

In order to solve the above problems, the present inventors repeated keen study and, as a result, determined that cordierite ceramics excellent in thermal resistance and thermal shock resistance by orienting the α-alumina crystal in a formed article of a cordierite-forming raw material, which led to the present invention. That is, according to the present invention, there is provided the following method for manufacturing cordierite ceramics.

According to a first aspect of the present invention, a method for manufacturing cordierite ceramics by forming and heating a cordierite-forming raw material containing α-alumina is provided, wherein a degree of orientation, expressed by $(I_{006}/(I_{300}+I_{006})$, where $I_{hkl}$ is height of X-ray diffraction intensity of an hkl-face of an α-alumina crystals, by X-ray diffraction measurement of an α-alumina crystal in a formed article of the raw material for forming cordierite is 0.10 or more.

According to a second aspect of the present invention, the method for manufacturing cordierite ceramics according to the first aspect is provided, wherein a ratio of an average length in an a-axial and a b-axial direction to an average length in a c-axial direction of a crystal of an α-alumina raw material powder is 3 or more.

According to a third aspect of the present invention, the method for manufacturing cordierite ceramics according to the first or second aspects is provided, wherein the cordierite ceramics have a honeycomb structure.

According to a fourth aspect of the present invention, the method for manufacturing cordierite ceramics according to any one of the above first to third aspects is provided, wherein the degree of orientation, expressed by $((I_{100}+I_{110})/(I_{100}+I_{110}+I_{002}+I_{004}))$, where $I_{hkl}$ is peak intensity of X-ray diffraction integral of an hkl-face of a cordierite crystal, of cordierite ceramics after heating is 0.92 or more.

According to a fifth aspect of the present invention, the method for manufacturing cordierite ceramics according to any one of the above first to fourth aspects is provided, wherein an average thermal expansion coefficient at 40 to 800° C. of cordierite ceramics after heating is 0.20 ppmK$^{-1}$ or less.

According to the present invention, there can be obtained cordierite ceramics where the c-axis of a cordierite crystal is dominantly oriented in comparison with conventional ones and which have excellent thermal resistance and thermal shock resistance. Therefore, the present invention is very useful industrially and useful for manufacture or the like of a ceramic catalyst carrier used for a purification apparatus for automobile exhaust gas, where particularly high thermal resistance and thermal shock resistance are required.

REFERENCE NUMERALS USED IN THE DRAWINGS

Figure 1:
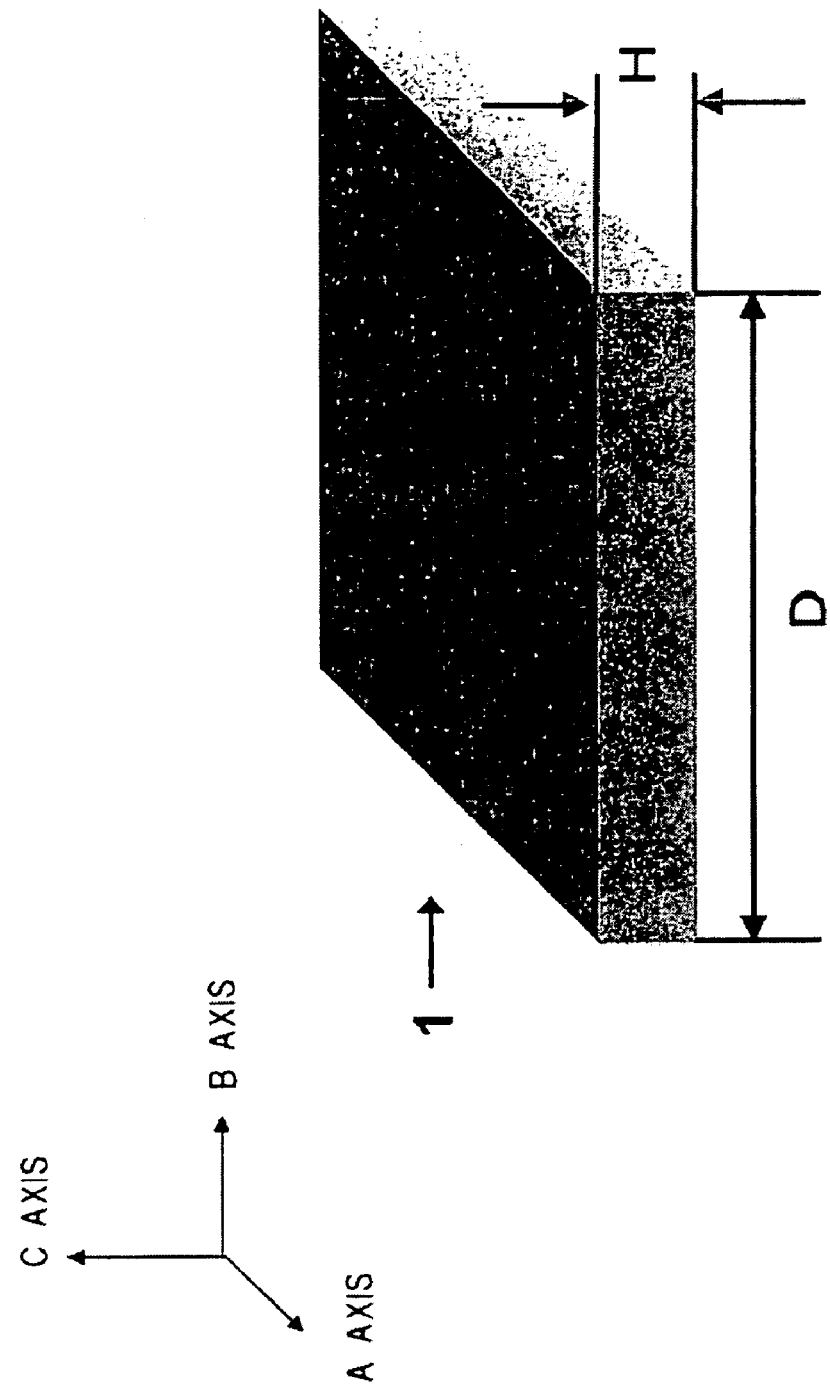
FIG. 1 is a schematic view showing a shape of a plate α-alumina particle.

1: α-alumina particle; 11: α-alumina crystal; 12: face perpendicular to c-face of crystal; and 13: face parallel with the c-face of crystal.

DETAILED DESCRIPTION OF THE INVENTION

Hereinbelow, embodiments of the present invention will be described in more detail. However, the present invention is by no means limited to the following embodiments, and changes, modifications, and improvements may be made as long as they do not deviate from the scope of the present invention.

As a chemical composition of cordierite ($2MgO \cdot 2Al_2O_3 \cdot 5SiO_2$) of the present invention, blending is performed so as to provide a chemical composition of 42 to 56 mass % of silica ($SiO_2$), 30 to 45 mass % of alumina ($Al_2O_3$), and 12 to 16 mass % of magnesia (MgO). However, inevitably mixed components, for example, $TiO_2$, CaO, KNaO, and $Fe_2O_3$ may be contained at 5 mass % or less as a whole.

In the present invention, talc, kaolinite, calcined kaolinite, and alumina, which are the main components of the raw material, are blended together so as to provide the above chemical composition by a conventionally know method. Needless to say, other than the aforementioned main components for the raw material, there are blended appropriate amounts of aluminum hydroxide, silica, methyl cellulose as an organic binder, a surfactant such as potassium laurate, and the like together, followed by kneading to obtain kneaded clay. There is no particular limitation on the means for preparing the kneaded clay by kneading a cordierite-forming raw material (raw material for forming), and a method using, for example, a kneader, a vacuum kneader, or the like, may be employed.

Next, the kneaded clay of the raw material for forming cordierite is formed by a forming method such as an extrusion method to obtain a formed article having a honeycomb shape. The formed article having a honeycomb shape is then dried and fired. For example, in the case of trying to obtain a honeycomb structure having a diameter of 110 mm, a length of 100 mm, a partition wall thickness of 75 μm, and a cell density of 600 cells/in$^2$, after the extruded formed article is dried, the article is fired at a temperature of 1410 to 1440° C. for about 3 to 10 hours to obtain a cordierite honeycomb structure.

Alternatively, cordierite ceramics may be manufactured by a general press-forming method with using kneaded clay of a cordierite-forming raw material. For example, by firing such a formed article formed by a press-forming method in the aforementioned conditions, cordierite ceramics having a predetermined thickness can be manufactured.

In a method for manufacturing cordierite ceramics of the present invention, an α-alumina particle having a specified shape is contained as one of the materials for the raw material for forming cordierite.

It is considered that, in order to obtain highly c-axis oriented cordierite crystals by firing, highly orient crystals of a raw material for forming cordierite are effective in a formed article of the raw material for forming cordierite before firing. Therefore, a method for manufacturing cordierite ceramics of the present invention is characterized in that the c-face ((006) face) of an α-alumina crystal is oriented with respect to a face serving as a standard in a formed article of the raw material for fowling cordierite.

Figure 2:
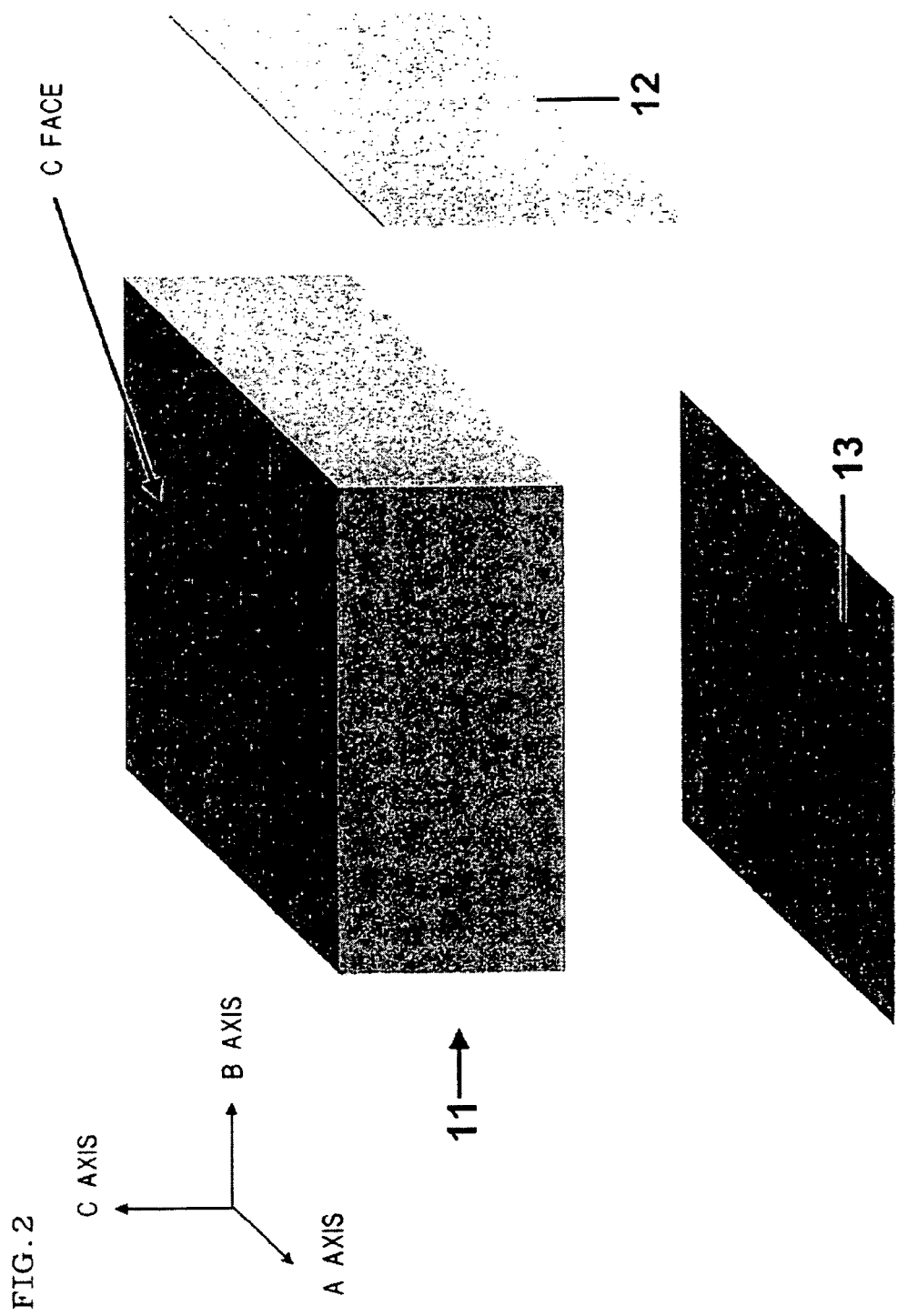
FIG. 2 is an explanatory view showing a face perpendicular to the c-face and a-face in parallel with the c-face of a plate α-alumina crystal.

The aforementioned orientation of the c-face ((006) face) of the α-alumina crystal in the formed article is determined according to the degree of orientation using the peak intensity obtained by the X-ray diffraction measurement. Specifically, it is calculated from $I_{006}/(I_{300}+I_{006})$(hereinbelow sometimes referred to as I-ratio of α-alumina crystal, where $I_{hkl}$ is height of X-ray diffraction intensity of a hkl face of an α-alumina crystal) using the peak intensity obtained by the X-ray diffraction intensity measurement. When the c-face ((006) face) of the α-alumina crystal is deposited at random with respect to the standard face, that is, when the c-face is not oriented, the I-ratio of the α-alumina crystal is 0.07. When the I-ratio of the α-alumina crystal is smaller than 0.07, as the I-ratio becomes smaller, the c-face ((006) face) of the α-alumina crystal is oriented so that the c-face becomes closer to the direction perpendicular to the standard face. When the I-ratio of the α-alumina crystal is larger than 0.07, as the I-ratio becomes larger, the c-face ((006) face) of the α-alumina crystal is oriented so that the c-face becomes closer to the direction in parallel with the standard face. Incidentally, as the relationship between the c-axial direction of the crystal and the standard face of the crystal, as shown in FIG. 2, in the crystal 11 as the α-alumina crystal, 12 denotes a face perpendicular to the c-face ((006) face) of the crystal 11, and 13 denotes a face parallel with the c-face ((006) face) of the crystal 11. In the present specification, the standard face means the face 13 in parallel with the c-face ((006) face) of the crystal 11. The I-ratio of a disoriented α-alumina crystal was calculated from the peak intensity of each of the 300 face and the 006 face of JSPDS card 46-1212.

In a method for manufacturing cordierite ceramics of the present invention, it is important that the degree of orientation calculated from the I-ratio of the α-alumina crystal with respect to the standard face in the formed article of a cordierite-forming raw material is 0.10 or more, and it is preferably 0.10 to 0.50. The degree of orientation calculated from the I-ratio of the α-alumina crystal is more preferably 0.20 to 0.50, and most preferably 0.40 to 0.50 because it is excellent in that the degree of orientation of the cordierite crystal in cordierite ceramics obtained by firing the formed article can be raised.

In a method for manufacturing cordierite ceramics of the present invention, the orientation (degree of Cd orientation) of the cordierite crystal constituting the cordierite ceramics obtained is determined according to the degree of orientation using the peak intensity obtained by the X-ray diffraction measurememt. Specifically, it is calculated by $(I_{100}+I_{110})/(I_{100}+I_{110}+I_{002}+I_{004})$(hereinbelow sometimes referred to as I-ratio of a cordierite crystal, where $I_{hkl}$ is peak intensity of X-ray diffraction integral of an hkl-face of a cordierite crystal) using the peak intensity obtained by the X-ray diffraction measurement. When the c-axis of the cordierite crystal is not oriented with respect to the standard face, the I-ratio of the cordierite crystal is 0.863. When the I-ratio of the cordierite crystal is smaller than 0.863, as the I-ratio becomes smaller, the c-axis of the cordierite crystal is oriented so that the c-axis becomes closer to the direction perpendicular to the standard face. On the other hand, when the I-ratio of the cordierite crystal is larger than 0.863, as the I-ratio becomes larger, the c-face of the cordierite crystal is oriented so that the c-face becomes closer to the direction in parallel with the standard face.

In a method for manufacturing cordierite ceramics of the present invention, the degree of orientation calculated by the I-ratio of the cordierite crystal in cordierite ceramics obtained is 0.92 or more, preferably 0.92 to 0.98. In a method for manufacturing cordierite ceramics of the present invention, when the degree of orientation calculated from the I-ratio of the α-alumina crystal with respect to the standard face in the formed article of a cordierite-forming raw material is larger than 0.07, as the degree of orientation becomes larger, the degree of orientation calculated from the I-ratio of the cordierite crystal with respect to the same standard face of the resultant cordierite ceramics tends to become larger. That is, when the c-face ((006) face) of the α-alumina crystal is orientated parallel with the standard face of the formed article of a cordierite-forming raw material, the c-axis of the cordierite crystal constituting the resultant cordierite ceramics is oriented parallel with the standard face.

As disclosed in JP-A-50-075611, cordierite ceramics where the c-axis of the cordierite crystal is oriented in parallel with the standard face show a low thermal expansion coefficient in the direction in parallel with the standard face and are excellent in thermal resistance and thermal shock resistance.

For example, in a cordierite honeycomb structure, with a face of the partition walls of a formed article of a cordierite-forming raw material being employed as the standard face, the c-face ((006) face) of the α-alumina crystal may be oriented parallel with the standard face. Thus, by orienting the α-alumina crystal in the formed article, the c-axis of the cordierite crystal can be oriented parallel with the face of the partition wall of the cordierite honeycomb structure obtained by firing. By controlling the orientation of the cordierite crystal as described above, there can stably be obtained a cordierite honeycomb structure having excellent thermal resistance and thermal shock resistance with suppressing the average thermal expansion coefficient at 40 to 800° C. in the direction parallel with the faces of the partition walls of the cordierite honeycomb structure to be as low as 0.20 ppmK$^{-1}$ or less.

In order to obtain a formed article where the c-face ((006) face) of the α-alumina crystal is oriented parallel with the standard face in the formed article of a cordierite-formning raw material, in the present invention, plate-like α-alumina particles are used as a material for the raw material for forming cordierite.

The shape of α-alumina particles can be roughly classified into a platy shape and a spherical shape. Generally, in a plate-like α-alumina particle, the face having the maximum area in one particle is the c-face ((006) face). The present invention is a method for manufacturing cordierite ceramics containing a particle 1 of an α-alumina crystal in the raw material, which has a plate shape as shown in FIG. 1.

The size of the particle (raw material powder) containing a plate-like α-alumina crystal used as a material in a method for manufacturing cordierite ceramics of the present invention is determined by a laser diffraction scattering method as a median diameter and may be 1 to 50 μm.

In the particle 1 containing a plate-like α-alumina crystal used in the present invention, the ratio (hereinbelow sometimes referred to as D/H) of average length D in the a-axial direction and the b-axial direction to the length H in the c-axial direction of the crystal is preferably 3 or more, more preferably 5 or more. Here, in FIG. 1, the average length H in the c-axial direction of the crystal in the particle 1 containing an α-alumina crystal is the average thickness of the plate particle 1, and the average length D in the a-axial direction and the b-axial direction of the crystal is the average width in the a-axial direction and the b-axial direction in the plate particle 1. Specifically, the average length H in the c-axial direction of the crystal of the plate particle 1 and the average length D in the a-axial direction and the b-axial direction of the crystal are measured by an electron microscope and electron beam backward scattering diffraction (EBSD).

In the present invention, the D/H of the plate α-alumina particle 1 as a material is preferably 3 to 20 because the degree of orientation of the α-alumina crystal with respect to the standard face in the resultant formed article becomes 0.12 or more. The D/H of the α-alumina particle 1 is more preferably 7 to 20 because the degree of orientation of the α-alumina crystal with respect to the standard face in the formed article becomes 0.2 or more. The D/H of the α-alumina particle 1 is most preferably 20 or more because the specification is excellent in that the degree of orientation of the α-alumina crystal with respect to the standard face in the formed article becomes 0.4 or more to obtain cordierite ceramics having improved thermal resistance and thermal shock resistance with an average thermal expansion coefficient of 0.10 ppmK$^{-1}$ at 40 to 800° C.

In the present invention, as a cordierite-forming raw material other than the plate α-alumina particle 1, there may also be contained talc and/or kaolinite of a plate particle. Further, silica and/or magnesia of a spherical particle may be contained as a material(s) for the raw material for forming cordierite.

The main materials of the raw material for forming cordierite other than the plate α-alumina particle 1 may be limited to silica and/or magnesia of a spherical shape without selecting talc or kaolinite of a plate particle. The limitation of a material of a plate particle to α-alumina enables to orient the c face ((006) face) of the α-alumina crystal in parallel with the standard face in the resultant formed article of a cordierite-forming raw material.

Hereinbelow, the present invention will be described in more detail on the basis of Examples. However, the present invention is by no means limited to the Examples.

(Preparation and Extrusion of Cordierite-forming Raw Material)

Ten kinds of raw materials for forming cordierite having the compositions shown in Table 1 were prepared by using alumina having the D/H shown in Table 1 as the alumina source. There were put into a kneader 100 parts by mass of each raw material for forming cordierite, 5 parts by mass of methyl cellulose as an organic binder, 0.5 part by mass of potassium laurate as a surfactant, and 33 parts by mass of water, and they were kneaded for 30 minutes to obtain kneaded clay. The kneaded clay was put in an extruder for extrusion, thereby obtaining a cylindrical honeycomb formed article.

Next, after the honeycomb formed article was subjected to dielectric drying and hot air drying, both the end faces were cut to have predetermined dimensions to obtain a honeycomb dried article. The honeycomb dried article was fired at 1430° C. for five hours to manufacture a cylindrical honeycomb structure (fired article). The honeycomb structure had a diameter of 110 mm, a whole length (flow passage length) of 100 mm, a partition wall thickness of 75 μm, and a cell density of 600 cells/in$^2$. Among the green bodies A to J in Table 1, A to C and F to H were used for Examples of the present invention as described later, and D, E, I, and J were used for Comparative Examples.

(Preparation and Press-forming of Cordierite-forming Raw Material)

Ten kinds of raw materials for forming cordierite having the compositions shown in Table 1 were prepared by using alumina having the D/H shown in Table 1 as the alumina source. Each of the raw materials for forming cordierites was kneaded for 15 minutes by a kneader, and the mixed powder was subjected to monoaxial press-forming to obtain a press-formed article. The press-formed article was fired at 1430° C. for five hours. The cordierite ceramics obtained by firing the formed article obtained by press-forming had a diameter of 20 mm and a thickness of 5 mm. Among the green bodies A to J in Table 1, A to C and F to H were used for Examples of the present invention as described later, and D, E, I, and J were used for Comparative Examples.

TABLE 1

| Green body No. | Raw material alumina D/H | Talc | Kaolinite | Calcined kaolinite | Alumina | Silica | Magnesia |
|---|---|---|---|---|---|---|---|
| A | 3.5 | 41 | 22 | 22 | 14 | 1 | 0 |
| B | 7 | 41 | 22 | 22 | 14 | 1 | 0 |
| C | 20 | 41 | 22 | 22 | 14 | 1 | 0 |
| D | 1.5 | 41 | 22 | 22 | 14 | 1 | 0 |
| E | 2.6 | 41 | 22 | 22 | 14 | 1 | 0 |
| F | 3.5 | 0 | 0 | 0 | 35 | 51 | 14 |
| G | 7 | 0 | 0 | 0 | 35 | 51 | 14 |
| H | 20 | 0 | 0 | 0 | 35 | 51 | 14 |
| I | 1.5 | 0 | 0 | 0 | 35 | 51 | 14 |
| J | 2.6 | 0 | 0 | 0 | 35 | 51 | 14 |

EXAMPLES 1 TO 6 AND COMPARATIVE EXAMPLES 1 TO 4

As shown in Table 2, when the degree of orientation of the α-alumina crystal of the formed article obtained by extrusion was 0.10 or more, even though the raw material composition other than α-alumina was different, the degree of Cd orientation of the honeycomb structure (fired article) could be 0.92 or more, and the average thermal expansion coefficient at 40 to 800° C. could be 0.20 ppmK$^{-1}$ or less. When the degree of orientation of the α-alumina crystal of the formed article obtained by extrusion was below 0.10, the degree of Cd orientation of the honeycomb structure (fired article) was below 0.92 with the average thermal expansion coefficient at 40 to 800° C. being above 0.20 ppmK$^{-1}$, and only the results equivalent to those of conventional articles could be obtained.

EXAMPLES 7 TO 12 AND COMPARATIVE EXAMPLES 5 to 8

As shown in Table 3, when the degree of orientation of the α-alumina crystal of the formed article obtained by press-forming was 0.10 or more, even though the raw material composition other than α-alumina was different, the degree of Cd orientation of the cordierite ceramics obtained by firing the formed article obtained by press-forming could be 0.92 or more. When the degree of orientation of the α-alumina crystal of the formed article obtained by press-forming was below 0.10, the degree of Cd orientation of the cordierite ceramics obtained by firing the formed article obtained by press-forming was below 0.92, and only the results equivalent to those of conventional articles could be obtained. From the above, even in cordierite dense articles such as cordierite ceramics obtained by firing the formed articles obtained by press-forming, it has become possible to raise the degree of Cd orientation by raising the degree of orientation of the α-alumina crystal in a formed article in the same manner as in a honeycomb structure (fired body).

TABLE 3

| | Green body No. | Forming method | Degree of alumina orientation in formed article | Degree of Cd orientation in fired article |
|---|---|---|---|---|
| Example 7 | A | Press-forming | 0.12 | 0.92 |
| Example 8 | B | Press-forming | 0.18 | 0.94 |

TABLE 2

| | Green body No. | Forming method | Degree of alumina orientation in formed article | Degree of Cd orientation in fired article | Thermal expansion coefficient (ppmK$^{-1}$) |
|---|---|---|---|---|---|
| Example 1 | A | Extrusion | 0.12 | 0.92 | 0.19 |
| Example 2 | B | Extrusion | 0.21 | 0.85 | 0.14 |
| Example 3 | C | Extrusion | 0.41 | 0.97 | 0.07 |
| Example 4 | D | Extrusion | 0.14 | 0.93 | 0.17 |
| Example 5 | E | Extrusion | 0.25 | 0.96 | 0.10 |
| Example 6 | F | Extrusion | 0.45 | 0.98 | 0.05 |
| Comp. Ex. 1 | G | Extrusion | 0.05 | 0.89 | 0.43 |
| Comp. Ex. 2 | H | Extrusion | 0.08 | 0.90 | 0.35 |
| Comp. Ex. 3 | I | Extrusion | 0.04 | 0.89 | 0.43 |
| Comp. Ex. 4 | J | Extrusion | 0.08 | 0.90 | 0.31 |

TABLE 3-continued

| Green body No. | Forming method | Degree of alumina orientation in formed article | Degree of Cd orientation in fired article |
|---|---|---|---|
| Example 9 | C | Press-forming | 0.37 | 0.97 |
| Example 10 | D | Press-forming | 0.10 | 0.92 |
| Example 11 | E | Press-forming | 0.22 | 0.95 |
| Example 12 | F | Press-forming | 0.42 | 0.97 |
| Comp. Ex. 5 | G | Press-forming | 0.03 | 0.89 |
| Comp. Ex. 6 | H | Press-forming | 0.06 | 0.90 |
| Comp. Ex. 7 | I | Press-forming | 0.06 | 0.90 |
| Comp. Ex. 8 | J | Press-forming | 0.09 | 0.90 |

Cordierite ceramics manufactured according to the present invention are suitable as a ceramic catalyst carrier used for a purification apparatus for automobile exhaust gas, where particularly high thermal resistance and thermal shock resistance are required, and very useful industrially.

What is claimed is:

1. A method for manufacturing a cordierite ceramic comprising:

forming a cordierite-forming raw material containing α-alumina into a green body, wherein a ratio of D/H of a crystal of an α-alumina raw material powder of the cordierite-forming raw material is 3 or more, wherein D represents an average of an a-axial direction length and a b-axial direction length, and H represents an average length in a c-axial direction, of the crystal of the α-alumina raw material powder, and wherein a degree of orientation, expressed by $(I_{006}/(I_{300}+I_{006}))$, where $I_{hkl}$ is height of X-ray diffraction intensity of an hkl-face of the α-alumina crystal, by X-ray diffraction measurement of the α-alumina crystal in the green body is 0.10 or more; and heating the formed green body to form the cordierite ceramic.

2. The method for manufacturing the cordierite ceramic according to claim 1, wherein the cordierite ceramic has a honeycomb structure.

3. The method for manufacturing the cordierite ceramic according to claim 1, wherein a degree of orientation, expressed by $((I_{100}+I_{110})/(I_{100}+I_{110}+I_{002}+I_{004}))$ where $I_{hkl}$ is a peak intensity of an X-ray diffraction integral of an hkl face of a cordierite crystal, of the cordierite ceramic after heating is 0.92 or more.

4. The method for manufacturing the cordierite ceramic according to claim 1, wherein an average thermal expansion coefficient at 40° C. to 800° C. of the cordierite ceramic after heating is 0.20 ppmK$^{-1}$ or less.

* * * * *